United States Patent [15] 3,649,245
Colombo et al. [45] Mar. 14, 1972

[54] PROCESS FOR THE PURIFICATION OF PYRITE CINDERS FROM NONFERROUS METALS, FROM ARSENIC AND FROM SULFUR

[72] Inventors: Umberto Colombo; Giuseppe Sironi; Bruno Viviani; Ariano Colombini, all of Novara, Italy

[73] Assignee: Montecatini Edison S.p.A., Milan, Italy

[22] Filed: July 24, 1969

[21] Appl. No.: 844,600

[30] Foreign Application Priority Data

July 26, 1968 Italy...................19452/68

[52] U.S. Cl.................................................75/9
[51] Int. Cl..........................C22b 1/08, C22b 1/10
[58] Field of Search.......................................75/6, 9, 7

[56] References Cited

UNITED STATES PATENTS

| 2,848,314 | 8/1958 | Johannsen et al. | 75/9 |
| 3,160,496 | 12/1964 | Vaccari et al. | 75/9 X |
| 3,235,328 | 2/1966 | Lerner et al. | 75/113 X |

FOREIGN PATENTS OR APPLICATIONS

| 554,003 | 3/1958 | Canada | 75/9 |
| 593,959 | 3/1960 | Canada | 75/9 |
| 802,037 | 9/1958 | Great Britain | 75/9 |
| 818,747 | 8/1959 | Great Britain | 75/7 |

Primary Examiner—Allen B. Curtis
Attorney—Curt M. Avery, Arthur E. Wilfond, Herbert L. Lerner and Daniel J. Tick

[57] ABSTRACT

A process for the purification of pyrite and pyrrhotite cinders from nonferrous metals, from arsenic and from sulfur. The process is characteristic in that the reduction of the hematite to magnetite is carried out in a fluid bed by direct injection of a hydrocarbon fuel and air in deficiency, at 850°–950° C. and with contact times from 15 to 45 minutes, up to a degree of reduction equal to from 10–90 percent, and in the presence of small quantities of HCl. The chlorination and reoxidation of the thus produced hot cinders is carried out in a fluid bed reactor with air and a chlorinating agent, at temperatures of from 650°–1,000° C., preferably at 850°–950° C. with contact time from 20 to 150 minutes, and that the gases leaving the reactor contain less than 0.5 percent by volume of free oxygen.

8 Claims, No Drawings

PROCESS FOR THE PURIFICATION OF PYRITE CINDERS FROM NONFERROUS METALS, FROM ARSENIC AND FROM SULFUR

As is known, pyrite cinders and pyrrhotite cinders, in order to be used in iron metallurgy, must have a very high-iron content and must be almost free of nonferrous metals such as Cu, Zn, Pb, as well as free from As and S. The maximum permissible limits for these impurities have steadily been dropping and at present, a good commercial product should contain not more than 0.03–0.05 percent of Cu, Zn, Pb and not more than 0.01–0.03 percent of As and S.

The nonferrous metals are eliminated by transforming them into chlorides or soluble sulfates and then by removing the salts with an acid leaching, by converting the metals into chlorides with $Cl_2$, HCl, $CaCl_2$, etc. and then by removing said chlorides from the cinders by voltilization at high temperature. The elimination of the As is either carried out in the course of roasting the pyrite or in the coarse of the various purification stages such as the reduction to magnetite, the leaching and the pelletization at high temperature. The removal of sulfur from the cinders is carried out partly during the various stages of the above mentioned purification.

IN general, the cinders have, at the end of these processes, a still too high content in sulfur, except those transformed into pellets hardened at a temperature above 1,150° C.

U.S. Pat. application Ser. No. 649,279, filed June 27, 1967 of Colombo et al., and now U.S. Pat. No. 3,499,754 describes a process for the purification of pyrite cinders from nonferrous metals (such as Cu, Zn, Pb, Au, Ag, Ni, Co, Cd and Mn).

The process of this Application comprises:

a. Preheating at temperatures between 600° and 850° C. and partial or total reduction (20–100 percent) of the hematite to magnetite by injecting a carbonaceous fuel and air into the fluid bed reactor. The air is insufficient for the total combustion.

b. Chlorination and oxidation of the reduced cinders at temperatures between 650° and 950° C., in a fluid bed reactor. The chlorinating gas mixture, consisting of air and chlorine, flows in countercurrent to the cinders. The quantity of chlorine, fed to the reactor, corresponds to the stoichiometric quantity for the formation of the nonferrous chlorides, with an excess of 5–20 percent.

c. Scrubbing the metal chlorides vapors to obtain an aqueous solution, from which the metals are recovered, by conventional hydrometallurgical processes.

The cinders freed from the nonferrous metals, but still containing sulfur, are directly conveyed to the high-temperature pelletizing stage if their contents in iron is sufficiently high, otherwise they are first subjected to magnetic concentration (beneficiation) after a previous magnetic reduction. The sulfur is volatilized as $SO_2$ during the hardening of the pellets at a high temperature.

According to an improvement of this process, described in U.S. Pat. application Ser. No. 840,058, filed on July 8, 1969 by Colombini et al., and based on Italian Pat. application No. 18688 A/68 of July 8, 1968, the reduction is conducted at higher temperatures (850°–950° C.) and at sufficiently long contact times (30–90 minutes) in order to decompose the ferrous arsenate. The subsequent chlorination is carried out in oxidizing atmosphere by keeping in the exit gases an oxygen concentration above 3 percent by volume. In this way the arsenic, still present after the chlorination stage, is in the form of soluble arsenate, removable by acid leaching of the purified cinders. However, in this case also, the residual sulfur is fully removed only during the hardening of the pellets at high temperature.

The transformation into pellets of the cinders containing sulfur, requires very high temperatures (from 1250° to 1350° C.), which temperatures are near the incipient softening point of the material. For this reason, it is necessary to adopt pelletizing systems, such as grade pelletizing, which will ensure a sufficiently homogeneous distribution of the temperature throughout the bed for facilitating a continuous operation of the plant. Such systems are, however, economically convenient only for high capacities (of at least 1,000 t/d, (ton day) ), owing to the high cost of the plant and to the low-scale factor, and to the operating costs. This explains the little use of the pelletizing technique in the treatment of pyrite cinders.

This shows how important it is to obtain cinders free of sulfur in order to be able to adopt cheap pelletizing systems also for plants of low-output capacities, for instance in systems operating at low temperature (less than 600° C).

We have now found that the operating conditions of the reduction and chlorination phases may be chosen in such a way as to obtain, at the end of the two phases, ashes purified, not only from nonferrous metals, but also from arsenic and sulfur. The final cinders, purified under such conditions, show a content of Cu, Pb, Zn of less than 0.05 percent, and for content in As and S of less than 0.02 percent. The final cinders thus obtained do not require any supplementary treatment, except for the enriching in Fe (in case that the contents in Fe is still low), and in particular they do not require acid leaching for the removal of the residual arsenic, nor they require any pelletizing at high temperature for the removal of the residual sulfur. These cinders may thus find different uses in the metallurgical industry, for instance they may be converted into pellets by means of cheaper low-temperature hardening process or they may be directly subjected to reduction in order to obtain a prereduced material (at the limit: iron sponge), with a low content in sulfur.

According to this invention, the heating and the reduction of the cinders is carried out in a fluid bed, by direct injection into the reactor of a hydrocarbon fuel, air and a small quantity of HCl Chlorine, $Cl_2$, also may be used, which is transformed into HCl under the reaction conditions. The operation at high temperature (850° - 950° C.) and in the presence of HCl brings about a high reduction and desulfurization rate and facilitates the voltilization of the arsenic, prevailingly as $As_2O_3$ and $AsCl_3$. The quantity of HCl may vary from a minimum of 40 percent of the quantity necessary for volatilizing all the As present as $AcCl_3$, to a maximum of 90 percent of the quantity required for volatilizing arsenic and lead as chlorides. The degree of conversion of the hematite into magnetite is between 10 and 90 percent and depends essentially on the thermal balance of the subsequent chlorination phase. The contact time is comprised between 15 and 45 minutes.

Still according to this invention, the chlorination and the reoxidation of the cinders thus reduced, are carried out in a single or multistage fluid bed, with air containing the chlorinating agent. The air is used in such a quantity as to oxidize almost completely the magnetite to hematite. The gases flowing out of the reactor should not contain free oxygen, which must be under 0.5 percent by volume. This can be accomplished by analyzing the gases flowing out from the apparatus and properly regulating the inlet of air and other gases. When the dew point of the metal chlorides is greater than the operational temperature, it will become necessary to dilute the air with inert gas, for instance with an exhausted chlorination gas, previously dried. The chlorinating agent is used in quantities of from 105–135 with respect to the stoichiometric quantity needed for converting the nonferrous metals into volatile chlorides. The chlorinating agents are inorganic compounds such as $Cl_2$, HCl, or chlorinated organic compounds, such as waste chloroalkanes (hexachloroethane, pentachloroethane, tetrachloroethane, chloropropanes). The chlorination is carried out between 650° and 1,000° C., but preferably between 850° and 950° C., with contact times from 20 to 150 minutes.

During the reducing phase, due to the high temperature, the reducing-chlorinating environment and the presence of water, the following reactions take place:

Partial conversion of the hematite into magnetite;

sulfur removal (over 90 percent), the residual pyrite decomposes to monosulfide, the sulfates for the most part are reduced to sulfides and to oxides (only small quantities of unreacted alkali earth sulfates remain in the cinders), while the sulfides are hydrolyzed;

partial decomposition of the ferrites present (MO, $Fe_2O_3$);

partial reduction of the oxides of Cu and Pb to metal Cu and Pb, when HCl is present in a sufficient quantity, the Pb volatilizes as chloride;

decomposition of the arsenates and the volatilization of the arsenic both as $As_2O_3$ and $AsCl_3$.

During the chlorination phase, the following reactions take place:

the chlorination and volatization of the nonferrous metals;

The almost total reoxidation of the magnetite to hematite by the action of the $O_2$ contained in the gas;

the further sulfur removal by the action of the reaction:
$M''SO_4 + Cl_2 \rightleftharpoons M''Cl_2 + SO_2 + O_2$
wherein $M''$ represents an alkali earth metal (calcium and barium), the reaction tends to shift to the right because the $O_2$ is subtracted from the equilibrium by reacting with the hematite present; also low contents in $O_2$ in the tail gases are quite sufficient to hinder this reaction;

the further dearsenification by the action of the chlorinating atmosphere which is free of $O_2$.

The main advantage, obtained by the process of this invention, is in the high dearsinification and desulfuration yield that is attained during the purification from the nonferrous metals. The absence of the sulfur makes the pelletizing of the cinders possible at temperatures lower than those required for the desulfuration and therefore allows the use of much cheaper techniques. Furthermore, the consumption of chlorination agent by the iron is reduced to a minimum. In the reduction stage, the water coming from the combustion of the oil and present in a high percentage in the gases, hinders the chlorination of iron; the hydrolysis of the FeS during the reduction eliminates the main source of formation of the iron chloride in the successive chlorination phase.

Another advantage, offered by the process of this invention, concerns the removal of the As and, in some cases, of the Pb, during the reduction phase. The aqueous solutions of metal chlorides, obtained by scrubbing the outlet gas from the chlorination are almost free of such impurities which would mean trouble in the hydrometallurgical process for the recovery of the nonferrous metals of greater value such as Cu, Zn, Ag, Au, etc.

From the literature (German Pat. No. 1,068,020) is already known a process by which one would obtain ashes purified from the nonferrous metals and which will contain residual contents in As of from 0.03–0.05 percent and in S of from 0.05–0.07 percent. The desulfuration, however, is accompanied by a heavy removal of Fe as chloride. The overall losses in Fe are, in fact, of the order of 3.5–6 percent which correspond to consumptions of chlorine of from 22 to 26 kg. per ton of cinders. Furthermore, the desulfuration cannot be complete, if the cinders to be treated contain alkali earth sulfates which are not decomposed under the conditions described in the cited German patent.

On the contrary, by operating according to the instant, invention, thanks to the previous elimination of S in the reduction phase, the overall loss in Fe will be less than 0.7 percent and the corresponding consumption of chlorine will be less than 5 kg. per ton of cinders. Furthermore, according to the above-cited German Patent, the dearsenification occurs completely at the expenses of the chlorinating agent, while with the process of this invention, thanks to the higher temperatures and to the atmosphere which is present in the reduction phase, the removal of arsenic occurs for the most part as $As_2O_3$.

The following examples are given for illustrating the present invention without however limiting the same. In these examples (as well as in the description preceding them and in the text following them) the percentages and the parts are by weight, where nothing to the contrary is indicated. $Nm^3$ means cubic meters reduced to normal conditions.

EXAMPLE NO. 1

From a roasting plant with fluid bed were discharged at a mean temperature of 500° C., 1,000 kg./hr. of Spanish pyrite cinders of the following chemical composition (percent by weight):

| | |
|---|---|
| Total Fe | 61.50 |
| total S | 1.94 |
| Monosulfide S | 0.93 |
| As | 0.33 |
| Cu | 0.88 |
| Zn | 2.50 |
| Pb | 0.91 |
| BaO | 0.33 |
| CaO | 0.13 |
| MgO | 0.09 |
| $Al_2O_3$ | 0.55 |
| $SiO_2$ | 3.45 |

These cinders were fed to a fluid bed reactor at the base of which were injected 27 kg./hr. of Bunker C fuel oil, 220 $Nm.^3$/hr. of air and 8 kg./hr. of a solution of HCl at 35.6 percent by weight. The hydrochloric acid corresponds to 60 percent of the stoichiometric for chlorinating the arsenic. The reactor operated at 900° C., the contact time of the solids in the bed was 25 minutes. The reduced cinders showed the following composition (in percent by weight):

| | |
|---|---|
| Fe | 63.4 |
| $Fe^{++}$ | 15.1 |
| Total S | 0.16 |
| Monosulfide S | 0.05 |
| As | 0.07 |
| Cu | 0.91 |
| Zn | 2.57 |
| Pb | 0.89 |

These cinders were continuously fed hot into a one stage fluid bed reactor. The feeding to the bottom of the reactor consisted of 43 $Nm.^3$/hr. of air, 59 $Nm.^3$/hr. of exhausted and dried recycling gases (tapped downstream of the scrubbing column of 50 chlorides), and 50 kg./hr. of $Cl_2$. The quantity of air fed was such as to ensure the practical absence of $O_2$ in the gases coming from the reactor (oxygen was 0.3 percent by volume). The quantity of $CL_2$ used, diminished by the quantity of $Cl_2$ for Ca and Ba, corresponded to 115% of the theoretical quantity necessary for chlorinating the nonferrous metals (Cu, Zn, Pb).

The reactor operated at 950° C. with a contact time for the solids in the fluid bed of 80 minutes. The discharged cinders showed the following composition (in % by weight):

| | |
|---|---|
| Total Fe | 66.10 |
| $Fe^{++}$ | 0.35 |
| Total S | 0.011 |
| As | 0.015 |
| Cu | 0.020 |
| Zn | 0.030 |
| Pb | 0.040 |

The losses in Fe through volatilization amount to 0.12 percent in the reduction phase and to 0.15 percent in the chlorination phase. The corresponding consumption of HCl and $Cl_2$ is respectively 1.1 and 1.8 kg./t. of treated cinders.

EXAMPLE NO. 2

1,000 kg./hr. of cinders at 500° C., described in the preceding example, were fed to a fluid bed reactor, at the base of which were introduced 26 kg./hr. of Bunker C fuel oil, 215 $Nm.^3$/hr. of air and 6.1 kg./hr. of gaseous HCl (corresponding to about 80 percent of the stoichiometric for the chlorination of lead and arsenic). The reactor operated at 900° C., while the contact time of the solids was maintained at 35 minutes. The cinders discharged from the fluid bed and from the cyclone showed the following composition (in percent by weight):

| | |
|---|---|
| Total Fe | 64.20 |
| $Fe^{++}$ | 14.00 |
| Total S | 0.19 |
| Monosulfide S | 0.06 |
| As | 0.042 |
| Cu | 0.91 |

| Zn | 2.60 |
| Pb | 0.085 |

These cinders feed a two stage fluid bed reactor. Into the lower stage of the reactor were introduced: 40 Nm.³/hr. of air, 60 Nm.³/hr. of exhausted recycling gases (tapped downstream of the scrubbing column for the chlorides and then dried), and 49.8 kg./hr. of HCl. The quantity of air is such as to ensure the practical absence of $O_2$ in the gases leaving the reactor (oxygen 0.2 percent by volume), while the HCl used, diminished by the quantity of HCl for the Ca and the Ba, represents 120 percent of the stoichiometric quantity required for chlorinating the residual nonferrous metals. The reactor operated at 930° C. while the overall contact time was 140 minutes. The discharged cinders showed the following percentual composition:

| Total Fe | 66.00 |
| $Fe^{++}$ | 0.12 |
| Total S | 0.010 |
| As | 0.018 |
| Cu | 0.038 |
| Zn | 0.045 |
| Pb | 0.030 |

The total loss in iron through volatilization was 0.64 percent, while the corresponding consumption of HCl was 5.15 kg. per ton of ashes.

We claim:

1. Process for the purification of pyrite and pyrrhotite cinders from nonferrous metals, from arsenic and from sulfur, which comprises carrying out the reduction of the hematite to magnetite in a fluid bed, by direct injection of a hydrocarbon fuel and air in deficiency, at 850°–950° C. and with contact time from 15 to 45 minutes, up to a degree of reduction equal to from 10–90 percent, and in the presence of small quantities of HCl, carrying out the chlorination and reoxidation of the thus produced hot cinders in a fluid bed reactor with air and a chlorinating agent, at temperatures from 650°–1,000° C., with contact time from 20 to 150 minutes, and that the gases leaving the reactor contain less than 0.5 percent by volume of free oxygen.

2. The process of claim 1, wherein the hydrochloric acid in the reduction phase is used in a quantity which is from a minimum of 40 percent of stoichiometric for chlorinating the arsenic, to a maximum of 90 percent of stoichiometric for chlorinating As and Pb.

3. The process of claim 1, wherein the chlorinating agent is chlorine or hydrochloric acid.

4. The process of claim 1, wherein the chlorinating agent is a waste chloroalkane.

5. The process of claim 1, wherein the chlorinating agent is used in a quantity of from 105–135 percent with respect to the stoichiometric required for converting the nonferrous metals into volatile chlorides.

6. The process of claim 1, wherein the purified cinders are pelletized at temperatures below 1,150° C.

7. The process of claim 1, wherein the purified cinders optionally enriched, are sent hot directly to the partial or total reduction to metal iron.

8. The process of claim 1, wherein the chlorination and reoxidation is at a temperature of 850°–950° C.

* * * * *